United States Patent [19]

Matsuda et al.

[11] 4,157,999
[45] Jun. 12, 1979

[54] ANTI-FOULING PAINT COMPOSITION

[75] Inventors: Sumio Matsuda, Ibaraki; Hajime Kudara, Shiga, both of Japan

[73] Assignee: Chugoku Marine Paints Ltd., Hiroshima, Japan

[21] Appl. No.: 855,230

[22] Filed: Nov. 28, 1977

[30] Foreign Application Priority Data

Aug. 10, 1977 [JP] Japan .................. 52-96248

[51] Int. Cl.² ........................ C09D 3/74; C09D 5/14; C09D 5/16
[52] U.S. Cl. .................... 260/42.21; 106/15.05; 260/42.44; 424/288; 428/541; 428/907; 526/240
[58] Field of Search ............... 260/2 M, 42.21, 42.44; 106/15 R; 526/240; 424/288; 428/541, 907

[56] References Cited

U.S. PATENT DOCUMENTS

| | | | |
|---|---|---|---|
| 3,167,473 | 1/1965 | Leebrick | 526/240 |
| 3,979,354 | 9/1976 | Dyckman et al. | 106/15 R |
| 4,010,141 | 3/1977 | Onozuka et al. | 106/15 R |
| 4,064,338 | 12/1977 | Russell | 526/240 |
| 4,075,319 | 2/1978 | Dyckman et al. | 428/288 |

FOREIGN PATENT DOCUMENTS

| | | |
|---|---|---|
| 40-21426 | 9/1965 | Japan. |
| 45-4186 | 2/1970 | Japan ............. 424/288 |
| 1124297 | 8/1968 | United Kingdom. |

*Primary Examiner*—Ronald W. Griffin
*Attorney, Agent, or Firm*—Armstrong, Nikaido, Marmelstein & Kubovcik

[57] ABSTRACT

Provided is an anti-fouling paint composition for preventing for an extended period of time fouling of submersed or submerged objects or marine structures. The paint composition comprises as an anti-fouling agent a copolymer comprised of (i) units of the formula:

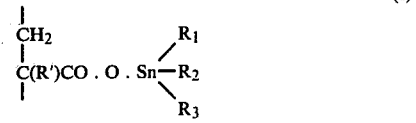

wherein R' is H or $CH_3$ and $R_1$, $R_2$ and $R_3$ are the same or different and selected from (Cl to 8) alkyl groups and a phenyl group, (ii) units of the formula:

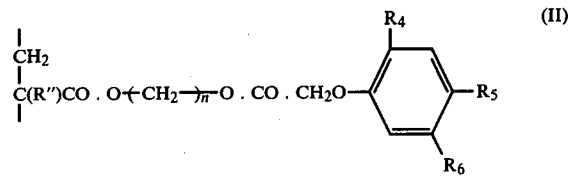

wherein R" is H or $CH_3$, n is an integer of 2 to 4, $R_4$ is Cl or (Cl to 4) alkyl group, $R_5$ is Cl or Br and $R_6$ is H, Cl or Br, and (iii) units of the formula:

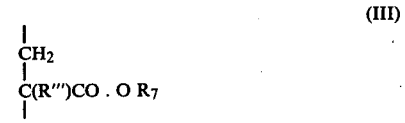

wherein R'" is H or $CH_3$ and $R_7$ is (Cl to 8) alkyl group.

6 Claims, No Drawings

ANTI-FOULING PAINT COMPOSITION

This invention relates to anti-fouling paint compositions for preventing for an extended period of time fouling of submersed or submerged objects or marine structures while also minimizing pollution.

Recently various anti-fouling paints have been developed which prevent for an extended period of time fouling of submerged structures. Most of these anti-fouling paints are characterized as comprising an organo-tin polymer.

For example, British Pat. No. 1,124,297 discloses an anti-fouling paint comprising a polymer vehicle having organo-tin radicals chemically combined therein, which radicals are of the formula: $SnR^1R^2R^3$ where $R^1$, $R^2$ and $R^3$ are n-propyl, isopropyl, n-butyl, n-amyl or phenyl. Typical polymer vehicles used are polymers of a salt of an $\alpha, \beta$-unsaturated acids and the organo-tin radical, such as poly(tri-n-butyltin methacrylate, and copolymers of such a salt and a copolymerizable monomer, such as a tri-n-butyltin methacrylate/methyl methacrylate copolymer. U.S. Pat. No. 3,979,354 discloses an anti-fouling composition comprising a 1,2-epoxy polymer cross-linked with a curing agent having a carboxylic acid group chemically bonded to an organo-tin compound, such as a copolymer of an organo-tin methacrylate and glycidyl methacrylate. Furthermore, Japanese Patent Publication 21426/1965 discloses an anti-fouling composition comprising a polymer derived from an unsaturated organo-tin monomer of the formula: $(R)_3SnO—CO.CR'=CHR''$ where R is propyl, butyl, amyl or hexyl, and R' and R'' are hydrogen, lower alkyl or phenyl.

The polymers of unsaturated organo-tin-containing monomers disclosed in the prior art references listed in the previous paragraph have an advantage over conventional low molecular weight anti-fouling agents in that the polymers remain effective for a long time. However, these anti-fouling polymers are less effective for preventing the fouling caused by slime and seaweed such as sea lettuce than for preventing the fouling caused by shellfish. Furthermore, most of the anti-fouling polymers are poor in shelf life stability.

It is an object of the present invention to provide an anti-fouling paint composition, the efficasy and life of which far exceed those of comparable paints having incorporated therein a polymer of an unsaturated organo-tin-containing monomer. Furthermore, the anti-fouling paint composition of the present invention is effective for preventing the fouling caused by slime and seaweed, as well as that caused by shellfish, and it exhibits improved shelf life stability.

In accordance with the present invention, there is provided an anti-fouling paint composition which comprises The anti-fouling paint composition of the invention is characterized by containing as the essential 20% to 60% by weight of at least one pigment and 20% to 60% by weight of a copolymer comprised of:

(i) 40% to 80% by weight, based on the weight of the copolymer, of units expressed by the formula:

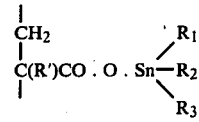

wherein R' is hydrogen or a methyl group, and $R_1$, $R_2$ and $R_3$ ae the same or different and selected from alkyl groups having 1 to 8 carbon atoms and a phenyl group, (ii) 5% to 50% by weight, based on the weight of the copolymer, of units expressed by the formula:

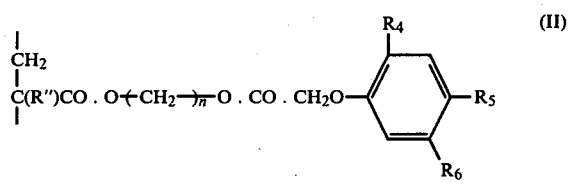

wherein R'' is hydrogen or a methyl group, n is an integer of 2 to 4, $R_4$ is chlorine or an alkyl group having 1 to 4 carbon atoms, $R_5$ is chlorine or bromine and $R_6$ is hydrogen, chlorine or bromine, and (iii) 5% to 30% by weight, based on the weight of the copolymer, of units expressed by the formula:

wherein R'' is hydrogen or a methyl and $R_7$ is an alkyl group having 1 to 8 carbon atoms.

The anti-fouling paint composition of the invention is characterized by containing, as the essential ingredient, a copolymer comprised of the above-mentioned three types of units expressed by the formulae (I), (II) and (III), which copolymer possesses an improved anti-fouling activity.

The copolymer may be prepared by copolymerizing three monomers expressed by the following formulae (IV), (V) and (VI).

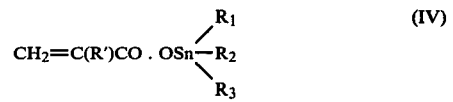

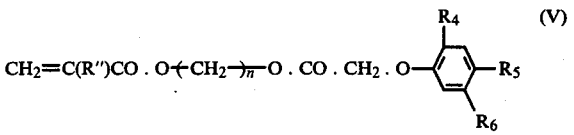

wherein R', R'', R''', n and $R_1$ through $R_7$ are the same as those defined with reference to the formulae (I), (II) and (III).

The monomer of the formula (IV) includes, for example, trimethyl-tin methacrylate, triethyl-tin methacrylate, tributyl-tin methacrylate, triphenyl-tin methacrylate, triethyl-tin acrylate, tributyl-tin acrylate and triphenyl-tin acrylate. The monomer of the formula (IV) may be prepared by, for example, condensing an organo-tin oxide or hydroxide of the formula:

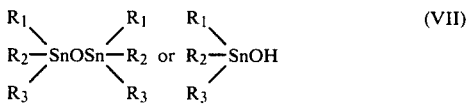

wherein $R_1$, $R_2$ and $R_3$ are the same as those defined with reference to the formula (I), with an unsaturated carboxylic acid expressed by the formula:

$$CH_2=C(R')CO.OH \qquad (VIII)$$

wherein R' is the same as that defined with reference to the formula (I). This condensation process is described in detail in U.S. Pat. No. 3,016,369.

In the copolymerization procedure for the preparation of the copolymer of the invention, a mixture of the organo-tin oxide or hydroxide of the formula (VII) and the unsaturated carboxylic acid of the formula (VIII) may be used instead of a partial or the whole amount of the monomer of the formula (IV), although this is not preferable.

The monomer of the formula (V) includes, for example, 2-(2,4-dichlorophenoxyacetic)ethyl acrylate, 2-(2-methyl-4-chlorophenoxyacetic)ethyl acrylate and 2-(2,4,5-trichlorophenoxyacetic)propyl acrylate.

The monomer of formula (V) may be prepared by the esterification of a compound of the formula:

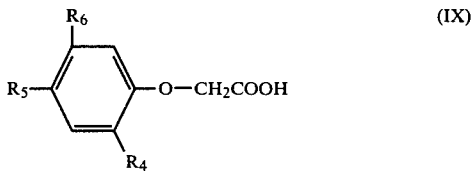

wherein $R_4$, $R_5$ and $R_6$ are the same as those defined with reference to the formula (II), with a compound of the formula:

$$CH_2=C(R'')CO.O{-}(CH_2)_n OH \qquad (X)$$

wherein R'' and n are the same as those defined with reference to the formula (II).

In the copolymerization procedure for the preparation of the copolymer, a mixture of the compound of the formula (IX) and the compound of the formula (X) may be used instead of a partial or the whole amount of the monomer of the formula (V), although this is not preferable.

The monomer of the formula (VI) includes, for example, acrylic acid esters and methacrylic acid esters, which have an alkyl group such as methyl, ethyl, propyl, n-butyl, n-hexyl, n-octyl or 2-ethylhexyl group.

The copolymerization of the above-mentioned three monomers of the formulae (IV), (V) and (VI) may be carried out in known manners and in the presence of a free radical initiator. In general the copolymerization may be carried out in a solvent at a temperature of about 20° C. to about 150° C. and for a period of 20 minutes to about 10 hours. The free radical initiator used includes, for example, azobisisobutyronitrile or benzoyl peroxide. The solvent used includes, for example, an aromatic hydrocarbon such as xylene or toluene. The respective monomers of the formulae (IV), (V) and (VI) may be used alone or in combination. The amounts of these monomers of the formulae (IV), (V) and (VI) are preferably 40% to 80% by weight, 5% to 50% by weight and 5% to 30% by weight, respectively, based on the total weight of the monomers for the copolymer.

Instead of copolymerising the three monomers of the formulae (IV), (V) and (VI), it is possible for a mixture of the monomers (VIII), (V) and (VI) to be copolymerized, followed by the esterification of the resulting copolymer with the monomer (VII); or a mixture of the monomers (IV), (X) and (VI) to be copolymerized, followed by the esterification of the resulting copolymer with the monomer (IX). Similarly, it is possible for a monomer of the formula "$CH_2=C(R''')COOH$" to be used instead of the monomer of the formula (VI) in the copolymerization, followed by the esterification of the resulting copolymer with an alcohol of the formula "$R_7OH$".

The copolymer may also comprise, in addition to the units derived from the three monomers of the formulae (IV), (V) and (VI), a minor proportion of units derived from at least one other copolymerizable monoethylenically unsaturated monomer. Such a copolymerizable monomer may be selected from those monomers which include, for example, styrene, α-methylstyrene, vinyl benzoate, vinyl chloride, acrylonitrile, vinyl acetate, ethylene and propylene. The amounts of these copolymerizable monomers are preferably below 20% by weight based on the total weight of the monomers for the copolymerization.

The copolymer preferably possesses an average molecular weight of approximately 4,000 to approximately 30,000. When the molecular weight is too large, the anti-fouling paint obtained becomes excessively viscous and is difficult to brush coat onto marine structures. When the molecular weight is too small, the anti-fouling paint obtained is also difficult to brush coat onto marine structures and, further, coatings of the anti-fouling paint obtained are not satisfactory because of their poor mechanical strengths.

The copolymer should preferably occupy 20% to 60% by weight of the dry weight of the anti-fouling paint composition.

The anti-fouling paint composition comprises, in addition to the copolymer mentioned above, one or more pigments which may be conventionally used in paints for submersed or submerged objects or marine structures. Such pigments include, for example, zinc oxide, titanium dioxide, iron oxide, copper oxide and aluminum oxide. The amounts of these pigments are preferably in the range of approximately 20% to 60% by weight, based on the weight of the paint composition.

If desired, the anti-fouling paint composition may further comprise other anti-fouling agents such as cuprous oxide, or additives, for example, an anti-sagging agent and filler such as talc. The amounts of these additives and other anti-fouling agents may vary depending upon the intended use of the paint composition but are usually in the range of approximately 1% to 60% by weight, based on the weight of the paint composition.

The invention will be further illustrated with reference to the following "preparation" examples, wherein preparations of the copolymers of the invention are illustrated, and to the following example, wherein anti-fouling paint compositions are illustrated. In the examples, % and parts are by weight unless otherwise specified. The application of the anti-fouling paint composition of the present invention to marine structures may be carried out by a conventional procedure wherein a suitable solvent is used.

EXAMPLES OF THE PREPARATION OF ANTI-FOULING POLYMERS

Preparation 1

One mole of tributyltin methacrylate, 0.6 mole of 2-(2,4-dichlorophenoxyacetic)ethyl acrylate and 1.5 moles of methyl methacrylate were charged in a reactor together with 500 g of toluene and 5 g of azobisisobutyronitrile. The content was maintained at a temperature of 80° to 85° C. for a period of approximately five hours, thereby to be copolymerized. The copolymer so prepared had an average molecular weight of approximately 9,000, and was insoluble in methyl alcohol and petroleum benzine, and soluble in benzene, toluene, xylene and methyl isobutyl ketone.

Preparation 2

One mole of tributyltin acrylate, 0.9 mole of 2-(2,4-dichlorophenoxyacetic)ethyl acrylate, 0.3 mole of methyl methacrylate and 0.8 mole of n-butyl methacrylate were charged in a reactor together with 500 g of toluene and 9 g of benzoyl peroxide. The content was maintained at a temperature of 90° to 95° C. for approximately eight hours thereby to be copolymerized. The product was a light yellow viscous liquid having a viscosity of approximately five poises as measured at 20° C. The copolymer had an average molecular weight of approximately 7,000.

Preparation 3

A half mole of acrylic acid, 0.4 mole of styrene, 0.1 mole of n-butyl acrylate, 0.1 mole of 2-hydroxyethyl methacrylate and 0.1 mole of octyl methacrylate were charged in a reactor together with 250 g of toluene and 2.5 g of benzoyl peroxide. The content was maintained at a temperature of 70° to 75° C. for approximately 5 hours thereby to be copolymerized. A half mole of triphenyltin hydroxide

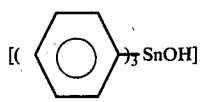

was added to the copolymer so formed. The mixture was maintained at a temperature of 100° to 120° C. for 1.5 hours, during which approximately 8 ml of water was distilled off. Then, 0.1 mole of MCP acid (2-methyl-4-chlorophenoxyacetic acid) was added to the reaction product. The mixture was maintained at a temperature of 100° to 120° C. for two hours, during which approximately 2 ml of water was distilled off. The reaction product so prepared was a light yellow viscous liquid. The copolymer had an average molecular weight of approximately 15,000.

Preparation 4

One mole of triphenyltin acrylate, 0.8 mole of 2-(2,4-dichlorophenoxyacetic)propyl acrylate, 0.9 mole of n-butyl methacrylate and 0.5 mole of styrene were charged in a reactor together with 300 g of toluene, 200 g of butyl Cellosolve and 9 g of azobisisobutyronitrile. The content was maintained at a temperature of 90° to 95° C. for approximately seven hours, thereby to be copolymerized. The copolymer so prepared had an average molecular weight of approximately 14,000 and, when coated on a glass sheet, it formed a stiff, transparent film.

Preparation 5

Following the procedure set forth in Preparation 4, a copolymer was prepared wherein triphenyltin methacrylate and 2-(2,4-dichlorophenoxyacetic)propyl methacrylate were used instead of triphenyltin acrylate and 2-(2,4-dichlorophenoxyacetic)propyl acrylate, respectively. The copolymer had an average molecular weight of approximately 15,000 and exhibited good film-forming properties.

Preparation 6

A half mole of tripropyltin acrylate, 0.5 mole of 2-(2-methyl-4-chlorophenoxylacetic)ethyl acrylate, 0.9 mole of i-butyl acrylate and 0.8 mole of 2-ethylhexyl methacrylate were charged in a reactor together with 500 g of methyl isobutyl ketone and 5.5 g of benzoyl peroxide. The content was maintained at a temperature of 80° to 85° C. for approximately seven hours, thereby to be copolymerized. The conversion was 98.5%. The product was highly viscous and the copolymer had an average molecular weight of approximately 11,000.

Preparation 7

A half mole of tributyltin methacrylate, 0.4 mole of 2-(pentachlorophenoxyacetic)ethyl methacrylate, 1.2 moles of methyl methacrylate and 7.0 g of benzoyl peroxide were dissolved in 300 g of xylene. This solution was added drop by drop to 200 g of toluene over a period of approximately 2.5 hours while being stirred at a temperature of 90° to 92° C. The reaction mixture was further stirred at a temperature of 95° to 98° C. for two hours. Then, a solution of 0.5 g benzoyl peroxide in 5 g of toluene was added to the reaction mixture. Further, the reaction mixture was stirred at a temperature of 95° to 98° C. for two hours and, then, cooled. The copolymer so prepared had an average molecular weight of approximately 6,000.

Preparation 8

Following the procedure set forth in Preparation 7, a copolymer was prepared wherein 0.4 mole of triphenyltin acrylate and 0.8 mole of 2-(2,4-dichlorophenoxyacetic)propyl acrylate were used instead of 0.5 mole of tributyltin methacrylate and 0.4 mole of 2-(pentachlorophenoxyacetic)-ethyl methacrylate, respectively.

Preparation 9

A half mole of acrylic acid, 0.4 mole of styrene, 0.4 mole of n-butyl acrylate, 0.2 mole of 2-hydroxyethyl acrylate and 0.2 mole of octyl methacrylate were charged in a reactor together with 150 g of toluene, 150 g of butyl Cellosolve and 3.5 g of azobisisobutyronitrile. The content was maintained at a temperature of 90° to 95° C. for approximately five hours thereby to be copolymerized. One fourth mole of tributyltin oxide was added to the reaction product. The mixture was maintained at a temperature of 100° to 120° C. for 1.5 hours, during which approximately 8.5 ml of water was distilled off. Then, 0.2 mole of 2,4-dichlorophenoxyacetic acid was added to the reaction product. The mixture was then maintained at a temperature of 115° to 120° C. for approximately 1.5 hours. The product so prepared was a colorless transparent and viscous liquid, and, when coated on a glass sheet, formed a stiff film. The copolymer had an average molecular weight of approximately 8,000.

Preparation 10

One mole of trimethyltin methacrylate, 1.0 mole of 2-(2-methyl-4-chlorophenoxyacetic)ethyl methacrylate, 1.0 mole of n-octyl methacrylate and 1.5 moles of vinyl acetate were charged in a reactor together with 150 g of xylene, 100 g of methyl ethyl ketone and 5 g of azobisisobutyronitrile. The content was maintained at a temperature of 95° to 105° C. for approximately six hours thereby to be copolymerized. The conversion was 98%. The product was a light yellow viscous liquid. The copolymer had an average molecular weight of approximately 5,000.

Examples of the preparation and evaluation of anti-fouling paints.

Following a conventional procedure, anti-fouling paints were prepared according to the receipe shown in Table I, below.

Table I

| Ingredient | Type A (parts) | Type B (parts) |
|---|---|---|
| Anti-fouling polymer | 45 | 28 |
| Cuprous oxide | — | 58 |
| Red iron oxide | 5 | 1 |
| Zinc oxide | 32 | 1 |
| Aluminum stearate | 0.5 | 1.5 |
| Bentone 34* | 1 | 1 |
| Xyrene | 16.5 | 9.5 |

*Anti-sagging agent supplied by National Lead.

For comparison purposes, three anti-fouling paints (X, Y and Z) were prepared according to the receipe shown in Table II, below.

Table II

| Ingredient | X (parts) | Y (parts) | Z (parts) |
|---|---|---|---|
| Cuprous oxide | 40 | — | — |
| Triphenyltin hydroxide | — | 20 | — |
| Talc | — | 5 | — |
| Rosin | 12 | — | — |
| Vinyl resin | 8 | — | — |
| Acrylic resin | — | 25 | — |
| Methyl isobutyl ketone | 20 | 20 | 10 |
| Xyrene | 20 | 15 | 10 |
| Rutile titanium dioxide | — | 15 | 10 |
| Tributyltin methacrylate/methyl methacrylate copolymer | — | — | 45 |
| Zinc flower | — | — | 25 |

Each anti-fouling paint was brush coated on the entire surface of a soft steel plate having a length of 30 cm, a width of 10 cm and a thickness of 2 mm. The coating thickness was approximately 200 microns. The coated plate was tested for its anti-fouling property by immersing in sea water in a natural environment. The proportion in percent of the area, which was covered by living things and slime, to the entire surface of the steel plate is shown in Table III, below.

Table III

| Anti-fouling paint* | Immersion period (months) | | | | | |
|---|---|---|---|---|---|---|
| | 6 | | 12 | | 24 | |
| | Living things | Slime | Living things | Slime | Living things | Slime |
| A 1 | 0 | 0 | 0 | 0 | 0 | 0 |
| A 2 | 0 | 0 | 0 | 0 | 0 | 0 |
| A 3 | 0 | 0 | 0 | 0 | 1 | 2 |
| A 4 | 0 | 0 | 0 | 0 | 0 | 0 |
| A 5 | 0 | 0 | 0 | 0 | 5 | 2 |
| A 6 | 0 | 0 | 0 | 0 | 0 | 5 |
| A 7 | 0 | 0 | 0 | 0 | 0 | 0 |
| A 8 | 0 | 0 | 0 | 0 | 0 | 0 |
| A 9 | 0 | 0 | 0 | 0 | 0 | 0 |
| A 10 | 0 | 0 | 0 | 0 | 0 | 0 |
| B 1 | 0 | 0 | 0 | 0 | 0 | 0 |
| B 2 | 0 | 0 | 0 | 0 | 1 | 5 |
| B 3 | 0 | 0 | 0 | 0 | 0 | 0 |
| B 4 | 0 | 0 | 0 | 0 | 0 | 0 |
| B 5 | 0 | 0 | 0 | 0 | 0 | 5 |
| B 6 | 0 | 0 | 0 | 0 | 0 | 0 |
| B 7 | 0 | 0 | 0 | 0 | 0 | 5 |
| B 8 | 0 | 0 | 0 | 0 | 0 | 0 |
| B 9 | 0 | 0 | 0 | 0 | 0 | 0 |
| B 10 | 0 | 0 | 0 | 0 | 0 | 0 |
| X | 0 | 5 | 0 | 10 | 30 | 60 |
| Y | 0 | 0 | 0 | 20 | 40 | 60 |
| Z | 0 | 20 | 5 | 40 | 20 | 50 |

*The letters "A" and "B" are the types of paints shown in Table I and numbers next to the letters show the numbers of Examples for the preparation of anti-fouling polymers.
The letters "X", "Y" and "Z" are comparative anti-fouling paints shown in Table II.

What we claim is:

1. An anti-fouling paint composition which comprises 20% to 60% by weight of at least one pigment and 20% to 60% by weight of a copolymer having an average molecular weight of approximately 4,000 to approximately 30,000 and comprising:

(i) 40% to 80% by weight, based on the weight of the copolymer, of units expressed by the formula:

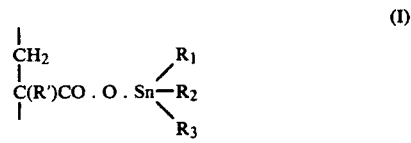

(I)

wherein R' is hydrogen or a methyl group and $R_1$, $R_2$ and $R_3$ are the same or different and selected from alkyl groups having 1 to 8 carbon atoms and a phenyl group, (ii) 5% to 50% by weight, based on the weight of the copolymer, of units expressed by the formula:

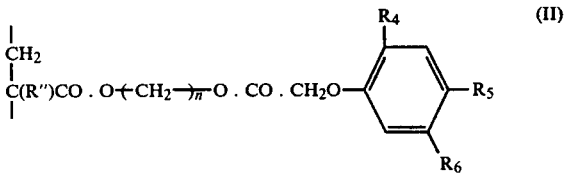

(II)

wherein R" is hydrogen or a methyl group, n is an integer of 2 to 4, $R_4$ is chlorine or an alkyl group having 1 to 4 carbon atoms, $R_5$ is chlorine or bromine and $R_6$ is hydrogen, chlorine or bromine, and (iii) 5% to 30% by weight, based on the weight of the copolymer, of units expressed by the formula:

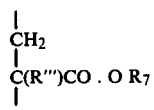
(III)

wherein R''' is hydrogen or a methyl group and $R_7$ is an alkyl group having 1 to 8 carbon atoms.

2. An anti-fouling paint composition as claimed in claim 1 wherein said copolymer further comprises below 20% by weight, based on the weight of the copolymer, of units derived from at least one other copolymerizable monoethylenically unsaturated monomer.

3. An anti-fouling paint composition as claimed in claim 1 wherein said copolymer is prepared by copolymerization of three monomers expressed by the formulae (IV), (V) and (VI):

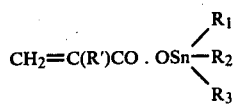
(IV)

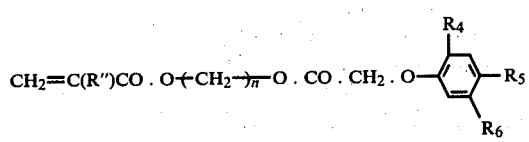
(V)

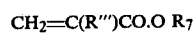
(VI)

wherein R', R'', R''', n and $R_1$ through $R_7$ are the same as those defined with reference to the formulae (I), (II) and (III).

4. An anti-fouling paint composition as claimed in claim 1 wherein said copolymer is prepared by copolymerizing three monomers expressed by the formulae (VIII), (V) and (VI):

$CH_2=C(R')CO.OH$ (VIII)

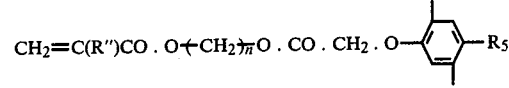
(V)

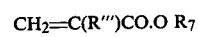
(VI)

wherein R', R'', R''', n and $R_4$ through $R_7$ are the same as those defined with reference to the formulae (I), (II) and (III); and then, treating the so produced copolymer with a monomer expressed by the formula (VII):

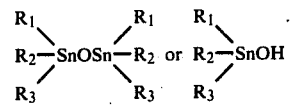
(VII)

wherein $R_1$, $R_2$ and $R_3$ are the same as those defined with reference to the formula (I).

5. An anti-fouling paint composition as claimed in claim 1 wherein said copolymer is prepared by copolymerizing three monomers expressed by the formulae (IV), (X) and (VI):

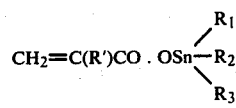
(IV)

$CH_2=C(R'')CO\ O(CH_2)_nOH$ (X)

$CH_2=C(R''')CO\ OR_7$ (VI)

wherein R', R'', R''', n and $R_1$, $R_2$, $R_3$ and $R_7$ are the same as those defined with reference to the formulae (I), (II) and (III); and then, treating the so produced copolymer with a monomer expressed by the formula (IX):

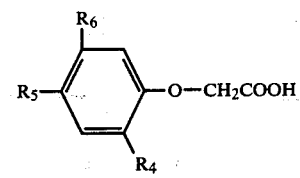
(IX)

wherein $R_4$, $R_5$ and $R_6$ are the same as those defined with reference to the formula (II).

6. An anti-fouling paint composition as claimed in claim 1 wherein said copolymer is prepared by copolymerizing three monomers expressed by the formulae (IV), (V) and (XI):

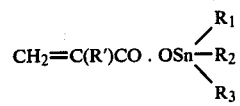
(IV)

(V)

$CH_2=C(R''')CO\ OH$ (XI)

wherein R', R'', R''', n and $R_1$ through $R_6$ are the same as those defined with reference to the formulae (I), (II) and (III); and then, treating the so produced copolymer with an alcohol expressed by the formula:

$R_7OH$ wherein $R_7$ is an alkyl group having 1 to 8 carbon atoms.

* * * * *